(12) United States Patent
Nishida

(10) Patent No.: US 9,798,297 B2
(45) Date of Patent: Oct. 24, 2017

(54) CONTROL DEVICE FOR ASTATIC SYSTEM HAVING DEAD TIME

(71) Applicant: Kobe Steel, Ltd., Hyogo (JP)

(72) Inventor: Yoshiharu Nishida, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 200 days.

(21) Appl. No.: 14/433,526

(22) PCT Filed: Oct. 15, 2013

(86) PCT No.: PCT/JP2013/078017
§ 371 (c)(1),
(2) Date: Apr. 3, 2015

(87) PCT Pub. No.: WO2014/061682
PCT Pub. Date: Apr. 24, 2014

(65) Prior Publication Data
US 2015/0277396 A1 Oct. 1, 2015

(30) Foreign Application Priority Data
Oct. 17, 2012 (JP) ................................ 2012-229924

(51) Int. Cl.
*G05B 11/42* (2006.01)
*G05B 11/36* (2006.01)
(Continued)

(52) U.S. Cl.
CPC ............ *G05B 11/42* (2013.01); *B60C 25/002* (2013.01); *G05B 7/02* (2013.01); *G05B 11/36* (2013.01); *G01M 17/02* (2013.01)

(58) Field of Classification Search
CPC .......... G05B 11/36; G05B 11/42; G05B 7/02; B60C 1/00; B60C 25/002; G01M 17/022; G01M 17/02
See application file for complete search history.

(56) References Cited

U.S. PATENT DOCUMENTS 4,047,338 A * 9/1977 Gormish ............ B29D 30/0633
451/1
5,335,165 A 8/1994 Shinskey
(Continued)

FOREIGN PATENT DOCUMENTS

JP 2010-122006 A 6/2010
JP 2010-205141 A 9/2010

OTHER PUBLICATIONS

International Search Report; PCT/JP2013/078017; dated Dec. 24, 2013.
(Continued)

*Primary Examiner* — Nathan L Laughlin
(74) *Attorney, Agent, or Firm* — Studebaker & Brackett PC

(57) ABSTRACT

A control device (1) for controlling a control target comprising an astatic system (2) that has dead time is provided with: a dead time compensation system (5) that compensates for dead time at the control target based on the dynamic characteristics of the control target; and an integration error compensation system (6) that compensates for integration errors originating in the dead time compensation system (5). The integration error compensation system (6) comprises: an ideal response unit (7) in which the dynamic characteristics of the control target while in a state in which interference is not input are used as a model; and a correction unit (8) that is configured to correct a comparative value for the output of the ideal response unit (7) and the output of the control target and subsequently input the result to the control target.

2 Claims, 6 Drawing Sheets

(51) Int. Cl.
*G05B 7/02* (2006.01)
*B60C 25/00* (2006.01)
*G01M 17/02* (2006.01)

(56) References Cited

U.S. PATENT DOCUMENTS

| | | | |
|---|---|---|---|
| 5,900,542 A | 5/1999 | Fricke et al. | |
| 2004/0054440 A1* | 3/2004 | Zhang | G05B 13/04 |
| | | | 700/245 |
| 2005/0251272 A1 | 11/2005 | Yu et al. | |
| 2011/0001529 A1* | 1/2011 | Gendai | H03G 3/301 |
| | | | 327/161 |
| 2011/0066291 A1 | 3/2011 | Morita et al. | |

OTHER PUBLICATIONS

Written Opinion of the International Searching Authority; PCT/JP2013/078017; dated Dec. 24, 2013.

\* cited by examiner

CONTROL DEVICE FOR ASTATIC SYSTEM HAVING DEAD TIME

TECHNICAL FIELD

The present invention relates to a technology that controls an astatic system having dead time.

BACKGROUND ART

For example, in a tire running test apparatus for a tire as disclosed in PTL 1, a belt looped between a pair of drums may be meandering or shifted from a proper position during the test of a tire. Hence, in this tire running test apparatus, the position of the belt is actually measured and then the swing quantity of the drum is made variable, to control the position of the belt.

A control system represented by this tire running test apparatus has dynamic characteristics having dead time and integration characteristics, and therefore may be conceived as "an astatic system having dead time."

As a control method of compensation for such "an astatic system having dead time," Smith compensation is well known.

For example, PTL 2 discloses a dead time compensation control unit that compensates for dead time at a control unit that feeds back the output of a control target having dead time and executes PI control or PID control based on the deviation from a target value. This dead time compensation control unit compensates for the dead time at the control target with a Smith compensator by a dead time Smith compensation method, and compensates for the dead time in the control unit with a control unit dead time compensator including control unit model means and control unit dead time model means.

CITATION LIST

Patent Literature

PTL 1: Japanese Unexamined Patent Application Publication No. 2010-122006
PTL 2: Japanese Unexamined Patent Application Publication No. 2010-205141

SUMMARY OF THE INVENTION

Technical Problem

As described in PTL 2, the Smith compensation is used for compensation of many control systems. However, at the same time, it is known that, in the Smith compensation, integration characteristics included in a compensation system for dead time influence (in other words, the difference in integral value between a model and an actual unit influences) an astatic system including integration, an offset error is generated, and hence control performance is degraded.

FIG. 1 shows an example of an astatic system having dead time and integration characteristics, and a control system that controls the astatic system. In general, a control target having integration characteristics may be typically cascade control in which controllers are connected in cascade, like control 1 and control 2.

If the tire running test apparatus (see FIG. 10) for a tire described in PTL 1 is also used as a model, the model corresponds to a control block diagram shown in FIG. 1. The control 1 (first controller) and the control 2 (second controller) in FIG. 1 are provided in a control unit in FIG. 10.

FIG. 2 shows the control result at step input in the control system shown in FIG. 1. In this control, the first controller executes P control and the second controller executes PI control (cascade control of P-PI control). As shown in FIG. 2, in case of the control system in FIG. 1, a control gain cannot be increased due to the influence of the dead time, and the response is late. If the control gain is excessively increased, hunting may be generated. The higher response cannot be attained with the simple cascade control.

Also, FIG. 3 shows an example in which a Smith compensation system (Smith compensation loop) is added to the control system in FIG. 1 and the dead time is compensated.

FIG. 4 shows the result of control in the control system in FIG. 3. As shown in FIG. 4, with the Smith compensation, the high response for step response is attained without the influence of the dead time. When a disturbance d is applied at the timing of 30 seconds and an integration error is generated, a case without the Smith compensation slowly approaches a target value 1. However, if the Smith compensation is provided, the error is not converged and an offset error $D_{off}$ is generated due to the integration error between the integral value of the Smith compensation system and the integral value of the actual unit.

As shown in FIG. 5, to prevent generation of the offset error $D_{off}$, there is known a method for restricting the influence of the integration error by adding high-pass characteristics (high-pass filter) to the output of the Smith compensation and cutting off the integration error generated in a low-frequency range.

FIG. 6 shows the result of control in the control system in FIG. 5. The control condition is similar to that in FIG. 4. As shown in FIG. 6, by adding the high-pass characteristics to the output of the Smith compensation, the offset error due to the integration error is improved. However, in this case, a large overshoot is generated at step response (response initial phase) (see part A in FIG. 6), the target-value response is markedly degraded.

The above-described situations are summarized as follows.

(1) In control of an astatic system having dead time and integration characteristics, gain-up cannot be attained without dead time compensation such as Smith compensation.

(2) However, if the Smith compensation is applied to the astatic system, an offset error is generated due to the influence of an integration error, possibly resulting in a problem.

(3) To restrict the offset error, there is known a method of cutting off an integration error component of the Smith compensation generated in a low-frequency range by using high-pass characteristics (low-frequency cutoff characteristics). However, since useful information other than the integration error present in the low-frequency range is also cut off, a problem may occur, in which target-value response is largely overshot at step input etc.

With regard to the above-described problems, an object of the invention is to provide a control device that can attain high response by gain-up for an astatic system having dead time while restricting an offset error originating in an integration error.

Solution to Problem

To attain the above-described object, the invention provides the following technical means.

A control device including an astatic system having dead time according to the present invention is a control device that controls a control target including "an astatic system having dead time," the control target having dynamic characteristics, the dynamic characteristics having dead time and integration characteristics, the control device including "a dead time compensation system" that compensates for the dead time at the control target based on the dynamic characteristics of the control target; and "an integration error compensation system" that compensates for an integration error originating in the dead time compensation system. The integration error compensation system includes an ideal response unit in which the dynamic characteristics of the control target in a state in which a disturbance is not input are used as a model, and a correction unit that receives an input comparative value for the output of the ideal response unit and the output of the control target, corrects the input comparative value, and then inputs the corrected comparative value to the control target.

Preferably, the control target may be a tire running test apparatus for a tire, the tire running test apparatus including an endless belt looped between a pair of drums and being configured to cause a tire for test to roll on the belt. Also, a swing parameter of the drum may be the input of the control target, and a position of the belt may be the output of the control target.

Advantageous Effects of Invention

With the control device of the invention, the high response by the gain-up can be attained for the astatic system having the dead time while restricting the offset error originating in the integration error.

DESCRIPTION OF EMBODIMENTS

Embodiments of a control device for an astatic system having dead time according to the invention are described below with reference to the drawings.

First, before a control device 1 of each embodiment is described, an astatic system 2 having dead time is described first.

Figure 10:
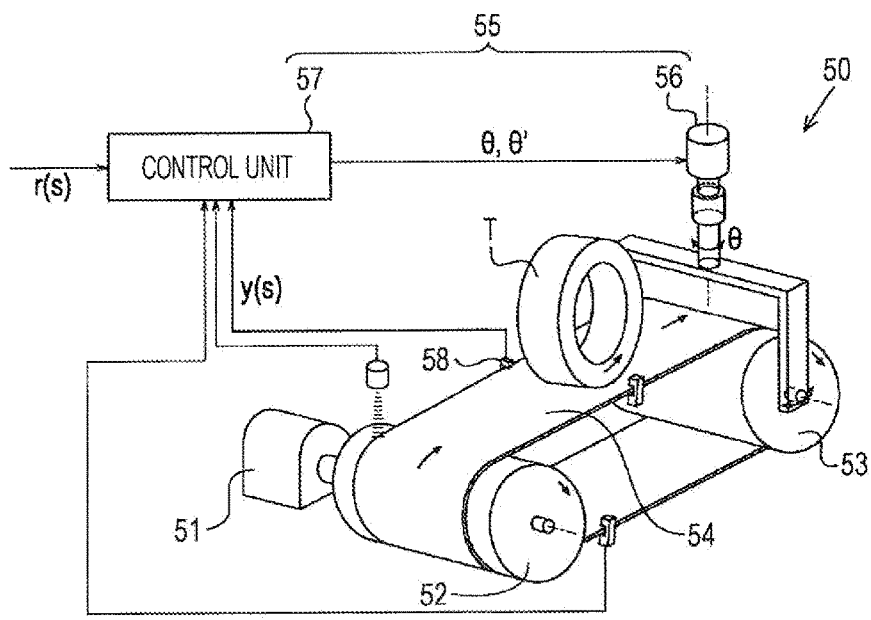
FIG. 10 is an illustration showing an overview of a tire running test apparatus for a tire.

A representative example of the astatic system 2 having the dead time is a tire running test apparatus for a tire T disclosed in PTL 1 (Japanese Unexamined Patent Application Publication No. 2010-122006). FIG. 10 shows a tire running test apparatus 50 for a tire T.

This tire running test apparatus 50 includes a driving drum 52 coupled with a driving motor 51 and being rotatable in forward and reverse directions, a driven drum 53 provided at a distance with respect to the driving drum 52 so that their axes are parallel to each other, and an endless belt 54 looped between the driving drum 52 and the driven drum 53. The tire T for test is grounded on a road surface (test road surface) formed on a flat surface of the belt 54. The tire running test apparatus 50 is configured to evaluate driving characteristics of the tire T by causing the tire T to be grounded on and roll on the test road surface on the belt 54.

Further, the tire running test apparatus 50 includes a belt meandering prevention apparatus 55. The belt meandering prevention apparatus 55 corrects meandering and positional shift of the belt 54 by swinging the driven drum 53, which is one of the driving drum 52 and the driven drum 53 provided in the tire running test apparatus 50, relative to the driving drum 52.

The belt meandering prevention apparatus 55 includes drum swinging means 56 for swinging the driven drum 53 relative to the driving drum 52 around a swinging axis extending along the up-down direction, and a control unit 57 that controls the drum swinging means 56. The drum swinging means 56 causes the position of the belt 54 to be variable in accordance with a swing parameter, such as its swing quantity θ, swing speed θ', or swing force. The belt meandering prevention apparatus 55 actually measures the belt position by a sensor 58 or the like, and then controls the belt position by using the integral value of the swing quantity of the drum.

A system represented by this tire running test apparatus 50 has dead time and integration characteristics, and therefore may be conceived as "an astatic system 2 having dead time."

First Embodiment

Figure 7:
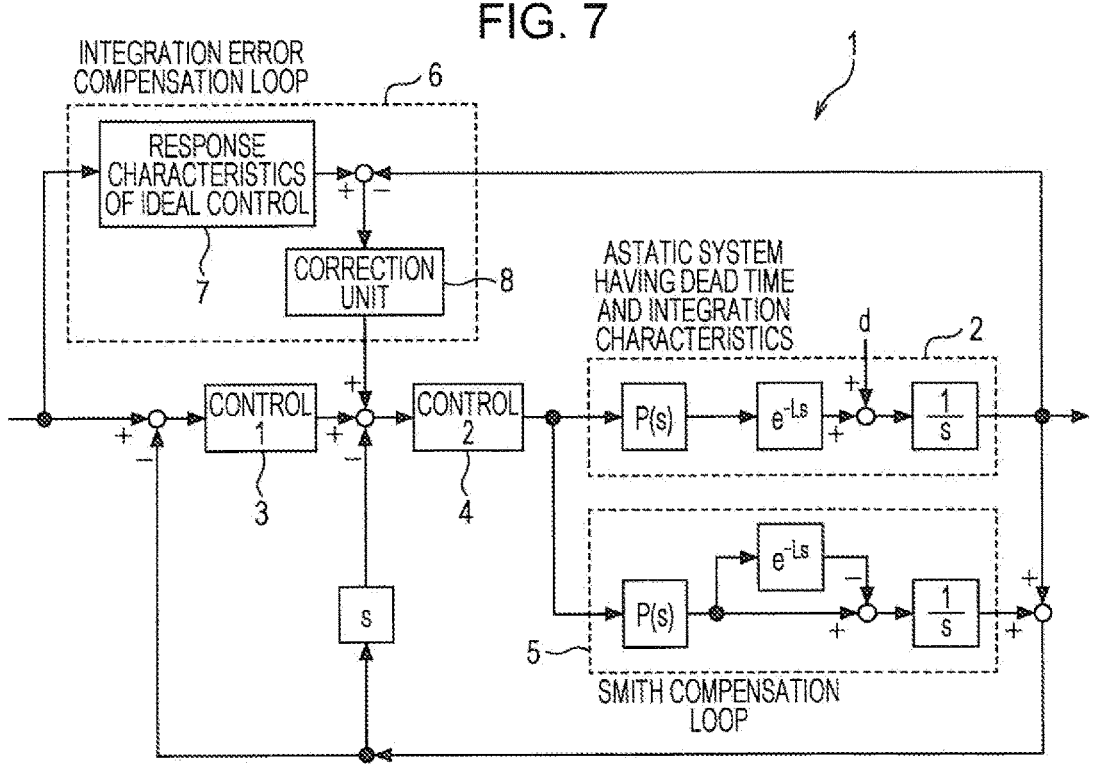
FIG. 7 is a block diagram of a control system according to a first embodiment.

FIG. 7 shows a first embodiment of the invention, and shows a control system expressing characteristics of the tire running test apparatus 50, that is, an astatic system 2 having dead time and a control device 1 that controls the astatic system 2, in the form of a block diagram.

The astatic system 2 having dead time (hereinafter, occasionally merely referred to as astatic system 2) is configured of P(s) originating in dynamic characteristics of the tire running test apparatus 50, $e^{-Ls}$ expressing dead time, and an integrator $1/s$. A disturbance d is input to the input side of the integrator $1/s$.

At the input part of such an astatic system 2, a first controller 3 (indicated as control 1 in the drawing) and a second controller 4 (indicated as control 2 in the drawing) for controlling the astatic system 2 are provided. The first controller 3 and the second controller 4 may employ P control and I control. A target input value is input to the astatic system 2 through the first controller 3 and the second controller 4. The astatic system 2 is controlled accordingly.

Also, the control device 1 according to this embodiment includes a Smith compensation system 5 (dead time compensation system) for the astatic system 2.

Figure 11:
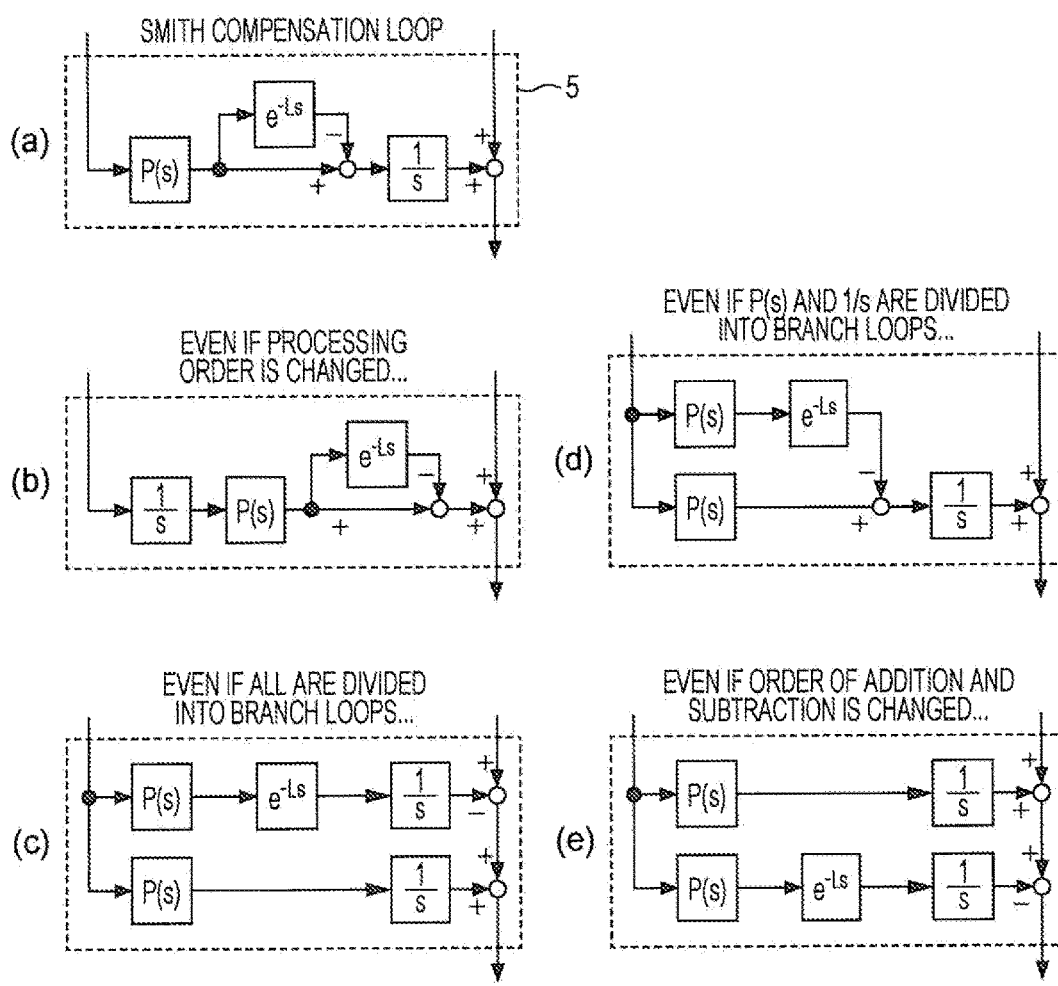
FIG. 11(*a*) to FIG. 11(*e*) are illustrations showing various forms of Smith compensation control.

Any of various forms shown in FIG. 11 may be employed as a configuration of the Smith compensation system 5. In this embodiment, a configuration in FIG. 7, in other words, a configuration in FIG. 11(a) is employed. In particular, the input value to the astatic system 2 (the output of the second controller 4) is split and input to P(s) that configures the Smith compensation system 5. The output of P(s) in the Smith compensation system 5 is split into two, and one is directly input to an integrator. The other is input to dead time $e^{-Ls}$, and a minus value of the output of $e^{-Ls}$ is input to the integrator. The output of the integrator of the Smith compensation system 5 is added to the output of the astatic system 2, and then negatively fed back to the input of the first controller 3. The added value of the output of the integrator of the Smith compensation system 5 and the output of the astatic system 2 is differentiated, and then negatively fed back to the input of the second controller 4.

Since the above-described control is cascade control and the feedback value to the first controller 3 is the output of the astatic system 2, it is conceived that the control corresponds to a position control loop in the tire running test apparatus 50 (control loop with swing quantity θ). Since the feedback value to the second controller 4 is the differential value of the output of the astatic system 2, it is conceived that the control corresponds to a speed control loop in the tire running test apparatus 50 (control loop with swing speed θ').

Further, as shown in FIG. 7, in case of this embodiment, an integration error compensation system 6 (integration error compensation loop) that restricts an integration error generated, for example, when a disturbance d is input to the astatic system 2 is provided.

The integration error compensation system 6 has an ideal response unit 7 (response characteristics of ideal control) having control response characteristics from the input to the output in an ideal state without a disturbance or an integration error during execution of the Smith compensation. In the integration error compensation system 6, the input value to the first controller 3 is split and input to the ideal response unit 7. On the other hand, the output from the astatic system 2 is fed back to the integration error compensation system 6, and the difference (comparative value) between the output of the astatic system 2 and the output of the ideal response unit 7 is calculated. This comparative value is input to a correction unit 8 included in the integration error compensation system 6. The output of the correction unit 8 is added to the input of the second controller 4. The correction unit 8 multiplies the input value by a predetermined gain (gain may be equal to 1), and outputs the result. Alternatively, a configuration that returns the output of the correction unit 8 to the first controller 3 may be employed, or a configuration that returns the output of the correction unit 8 to the output value of the second controller 4 may be employed.

In this case, the characteristics of the ideal response unit 7 are given by Expression (1).

[Math. 1]

$$G(s) = \frac{C1(s) \cdot C2(s) \cdot P(s)}{C1(s) \cdot C2(s) \cdot P(s) + \{1 + C2(s) \cdot P(s)\} \cdot s} \cdot e^{Ls} \quad (1)$$

Herein, P(s) indicates dynamic characteristics after the integration characteristics and the dead time of the control target are removed, C1(s) indicates dynamic characteristics of the first controller 3, and C2(s) indicates dynamic characteristics of the second controller 4.

Figure 6:
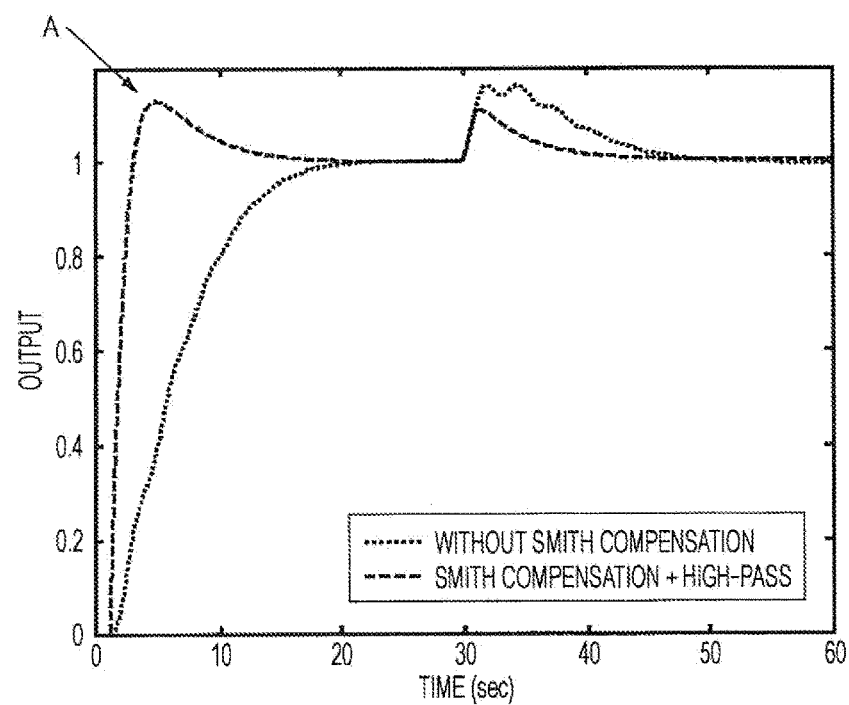
FIG. 6 is an illustration showing the result of control in the control system in FIG. 5.
Figure 8:
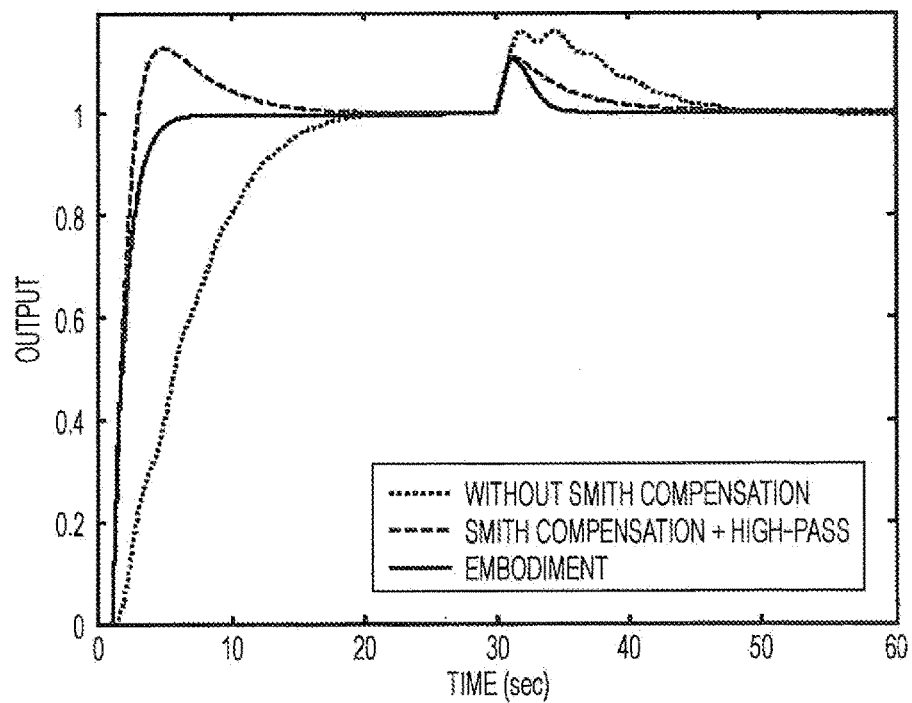
FIG. 8 is an illustration showing the result of control in the control system according to the first embodiment.

FIG. 8 shows the control result when the control device (embodiment) of this embodiment that adds the output of the correction unit 8 to the input of the second controller 4 is used. The control condition is the same as that in FIG. 6.

Figure 1:
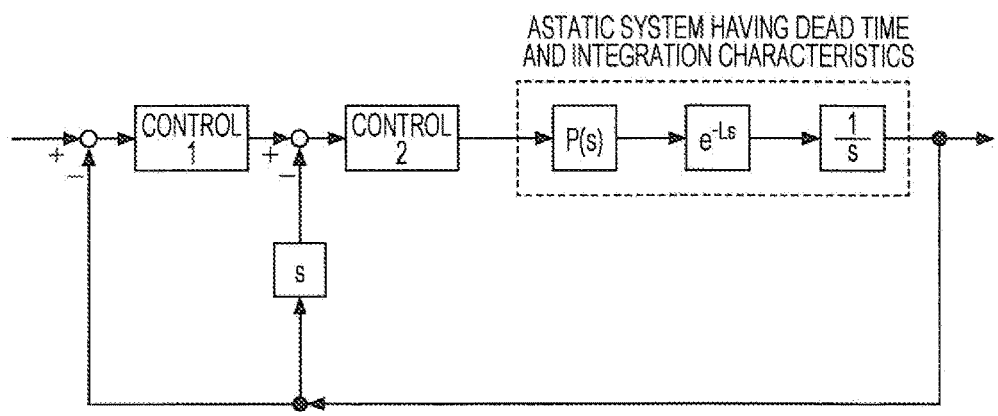
FIG. 1 is a block diagram showing a control system that executes cascade control for an astatic system having dead time and integration characteristics.
Figure 2:
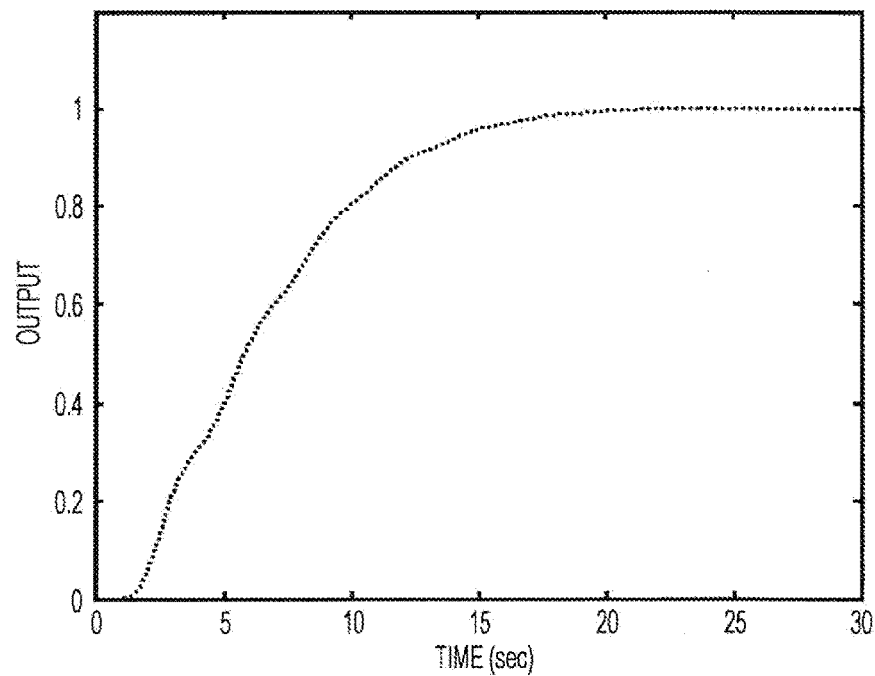
FIG. 2 is an illustration showing the result of control in the control system in FIG. 1.
Figure 3:
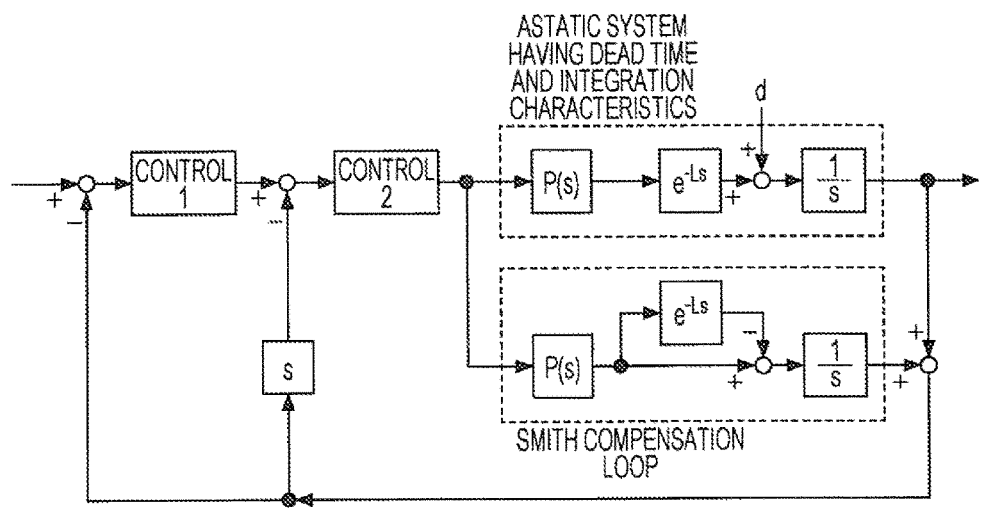
FIG. 3 is a block diagram showing a control system that executes Smith compensation for an astatic system having dead time and integration characteristics.
Figure 4:
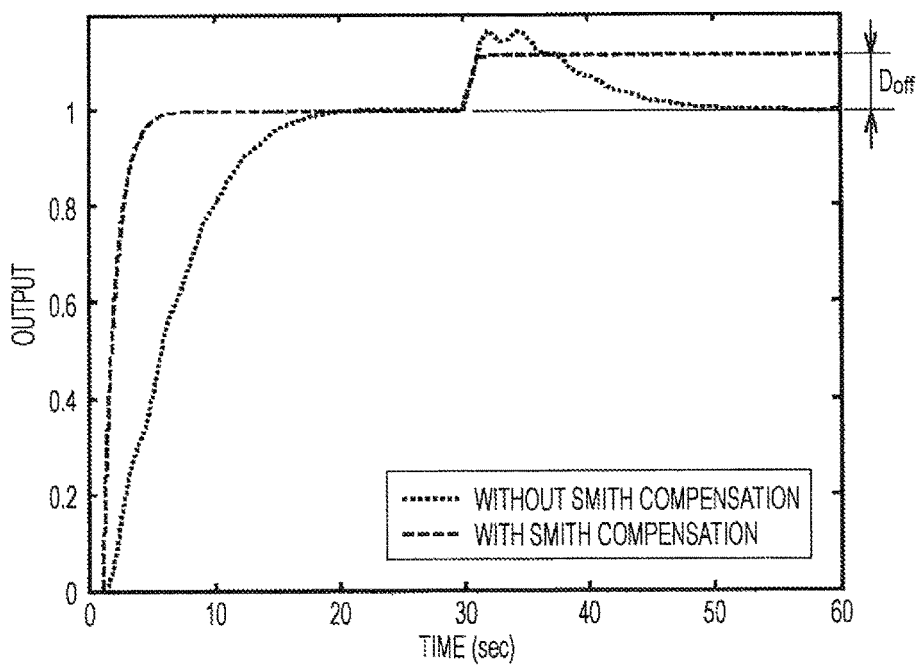
FIG. 4 is an illustration showing the result of control in the control system in FIG. 3.
Figure 5:
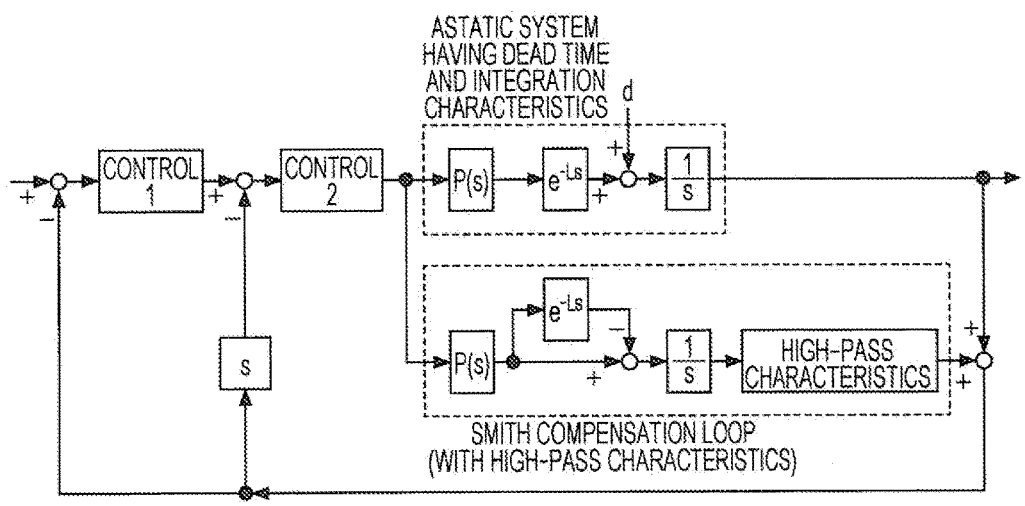
FIG. 5 is a block diagram showing a control system that executes Smith compensation and additionally has high-pass characteristics, for an astatic system having dead time and integration characteristics.

As shown in FIG. 8, with the control device of this embodiment, it is found that the overshoot in the response initial phase disappears as compared with the control method of the Smith compensation system 5 (with the high-pass filter). Accordingly, step response with high response can be provided. In addition, with the control device of this embodiment, it is found that the influence of the integration error when the disturbance d being the problem is applied, that is, the offset error $D_{off}$ as shown in FIG. 4 is eliminated early, and becomes substantially zero in a short time.

As described above, with the control device 1 according to the first embodiment, by providing the dead time compensation system 5 with the Smith compensation, high response by gain-up can be attained. At this time, the offset error due to the integration error generated at the Smith compensation system 5 is restricted by additionally providing the integration error compensation system 6. Hence, the influence of the disturbance or the like can become restricted as soon as possible. The integration error compensation system 6 executes control in accordance with the difference between the output with the ideal control response characteristics at the Smith compensation and the actual output. Accordingly, generation of the offset error due to the disturbance can be restricted without providing the high-pass filter or the like at the downstream side of the Smith compensation.

Second Embodiment

Figure 9:
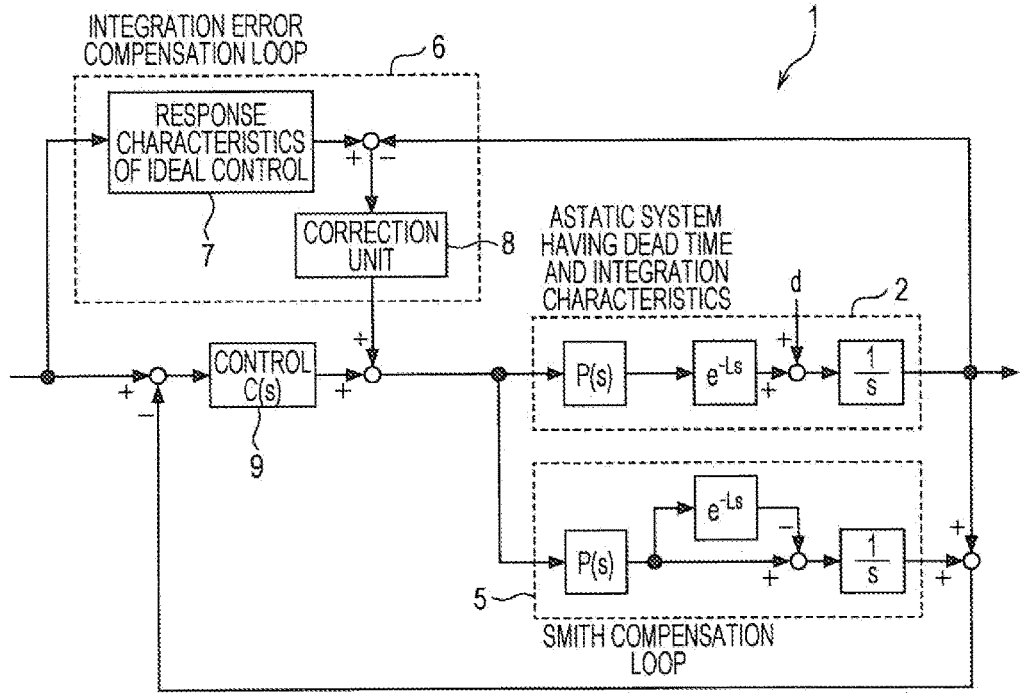
FIG. 9 is a block diagram of a control system according to a second embodiment.

FIG. 9 shows a second embodiment of the invention.

A control device 1' of the second embodiment shown in FIG. 9 is similar to the control device 1 of the first embodiment in that the control target is "an astatic system having dead time." Also, the Smith compensation system 5 is similarly provided for the astatic system 2. Further, the integration error compensation system 6 that restricts the integration error generated, for example, when the disturbance d is input to the astatic system 2 is similarly provided. The integration error compensation system 6 similarly includes the ideal response unit 7 and the correction unit 8.

However, the control device 1' of the second embodiment shown in FIG. 9 is significantly different from the control device 1 of the first embodiment in that the control device 1' includes only a single controller.

In particular, in the control device 1' of the second embodiment, the input to the astatic system 2 is made through a controller 9. The output of the astatic system 2 is added to the output of the Smith compensation system 5, and then is negatively fed back to the input of the controller 9. That is, the control system of the second embodiment is a non-cascade system, and the feedback value to the controller 9 is the output of the astatic system 2. Hence, for example, the control system corresponds to a control system that controls a motor.

In the integration error compensation system 6 of the second embodiment, the input value to the controller 9 is split and input to the ideal response unit 7. On the other hand, the output from the astatic system 2 is fed back to the integration error compensation system 6, and the difference (comparative value) between the output of the astatic system 2 and the output of the ideal response unit 7 is calculated. This comparative value is input to the correction unit 8 (gain may be equal to 1) included in the integration error compensation system 6. The output of the correction unit 8 is added to the output of the controller 9.

In this case, the characteristics of the ideal response unit 7 are given by Expression (2).

[Math. 2]

$$G(s) = \frac{C(s) \cdot P(s)}{C(s) \cdot P(s) + s} \cdot e^{Ls} \quad (2)$$

Herein, P(s) indicates dynamic characteristics after the integrator and the dead time of the control target are removed, and C(s) indicates dynamic characteristics of the controller 9.

Even with the control device 1' of the second embodiment, high response by gain-up can be attained for the astatic system 2 having the dead time while restricting the offset error originating in the integration error.

Modifications

The specific configuration of the Smith compensation system 5 described in the first embodiment and the second embodiment is not limited to the described single configuration.

FIG. 11 shows various configurations of the Smith compensation system 5 (Smith compensation loop). In the above-described first embodiment and second embodiment, the configuration in FIG. 11(*a*) is employed for the Smith compensation system 5. However, any of configurations in FIG. 11(*b*) to FIG. 11(*e*) may be employed.

For example, FIG. 11(*b*) shows a configuration in which the order of the dynamic characteristics P(s), the dead time $e^{-Ls}$, and the integrator 1/s is changed, so that a signal is transmitted from the input side in order of the integrator 1/s, the dynamic characteristics P(s), and then the dead time $e^{-Ls}$.

FIG. 11(*c*) and FIG. 11(*e*) each show a configuration in which the configuration in FIG. 11(*a*) is changed to parallel arrangement. In particular, in FIG. 11(*c*), two lines of transmission paths for a signal are provided. The dynamic characteristics P(s), the dead time $e^{-Ls}$, and the integrator 1/s are arranged in one line, and a transmitted signal being a minus value is added to the output side (that is, subtraction is performed). Also, the dynamic characteristics P(s) and the integrator 1/s are arranged in the other line. A transmitted signal being a plus value is added to the output side. FIG. 11(*e*) is different from FIG. 11(*c*) only for the order of addition and subtraction to the output side.

FIG. 11(*d*) has a configuration in which the dynamic characteristics P(s) are arranged in parallel as compared with the configuration in FIG. 11(*a*). In particular, in FIG. 11(*d*), the input signal is split, the dynamic characteristics P(s) and the dead time $e^{-Ls}$ are arranged in one line, and the dynamic characteristics P(s) and the integrator 1/s are arranged in the other line. The output of the dead time $e^{-Ls}$ in the one line is set at a minus value at the input side of the integrator 1/s of the other line and is combined (that is, subtraction is performed), and the output of the integrator 1/s becomes the output of the Smith compensation system 5.

Even if the Smith compensation system 5 of any of FIG. 11(*a*) to FIG. 11(*e*) described above is used, the effects and advantages attained by the invention can be provided.

It is to be noted that the embodiments disclosed this time are merely examples for all points and are not limited thereto. In particular, in the embodiments disclosed this time, matters that are not explicitly disclosed, for example, driving conditions, operating conditions, various parameters, dimensions of components, weights, volumes, and so forth, may employ values that are within ranges generally employed by those skilled in the art and that can be easily conceived by those skilled in the art.

For example, the control technology of the invention is not limited to the tire running test apparatus 50 for the tire T, and may be applied to any system as long as the system is expressed by the astatic system 2 having the dead time.

This application is based on Japanese Patent Application (Japanese Patent Application No. 2012-229924) filed Oct. 17, 2012, which is hereby incorporated by reference herein.

REFERENCE SIGNS LIST

1, 1' control device
2 astatic system
3 first controller
4 second controller
5 Smith compensation system (dead time compensation system)
6 integration error compensation system
7 ideal response unit
8 correction unit
9 controller
50 tire running test apparatus
51 driving motor
52 driving drum
53 driven drum
54 belt
55 belt meandering prevention apparatus
56 drum swinging means
57 control unit
58 sensor
T tire

The invention claimed is:

1. A control device that controls a tire running test apparatus for a tire, said tire running test apparatus including an endless belt looped between a pair of drums and being configured to cause a tire for test to roll on the belt, said tire running test apparatus having dynamic characteristics, the dynamic characteristics having dead time and integration characteristics, the control device comprising:

a dead time compensation system that compensates for the dead time at the tire running test apparatus based on an input and an output of the tire running test apparatus; and an integration error compensation system that compensates for an integration error originating in the dead time compensation system based on the input and the output of the tire running test apparatus, wherein the integration error compensation system includes an ideal response unit in which the dynamic characteristics of the tire running test apparatus in a state in which a disturbance is not input to the tire running test apparatus during execution of the dead time compensation system are used as a model, and a correction unit that receives an input comparative value for the output of the ideal response unit and the output of the tire running test apparatus, corrects the input comparative value by multiplying the input comparative value by a predetermined gain, and then inputs the corrected comparative value to the tire running test apparatus, wherein a swing quantity or a swing force of the drum is the input of the tire running test apparatus, and a position of the belt is the output of the tire running test apparatus.

2. A control device that controls a tire running test apparatus for a tire, said tire running test apparatus including an endless belt looped between a pair of drums and being configured to cause a tire for test to roll on the belt, said tire running test apparatus having dynamic characteristics, the dynamic characteristics having dead time and integration characteristics, the control device comprising:

a Smith compensation system that compensates for the dead time at the tire running test apparatus based on an input and an output of the tire running apparatus; and an integration error compensation system that compensates for an integration error originating in the Smith compensation system based on the input and the output of the tire running test apparatus, wherein the integration error compensation system includes an ideal response unit in which the dynamic characteristics of the tire running test apparatus in a state in which a disturbance is not input to the tire running test apparatus during execution of the dead time compensation system are used as a model, and a correction unit that receives an input comparative value for the output of the ideal response unit and the output of the tire running test apparatus, corrects the input comparative value by multiplying the input comparative value by a predetermined gain, and then inputs the corrected comparative value to the tire running test apparatus, wherein a swing quantity or a swing force of the drum is the input of the tire running test apparatus, and a position of the belt is the output of the tire running test apparatus.

* * * * *